United States Patent
Staudacher et al.

(10) Patent No.: US 6,956,978 B2
(45) Date of Patent: *Oct. 18, 2005

(54) MULTI-PASS DARK FRAME SUBTRACTION

(75) Inventors: David J. Staudacher, Ft. Collins, CO (US); Kevin Matherson, Ft. Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 610 days.

This patent is subject to a terminal disclaimer.

(21) Appl. No.: 10/094,638

(22) Filed: Mar. 12, 2002

(65) Prior Publication Data
US 2003/0174901 A1   Sep. 18, 2003

(51) Int. Cl.⁷ .................................. G06K 9/40
(52) U.S. Cl. ................. 382/274; 382/232; 348/243; 358/483
(58) Field of Search .................. 382/274–275, 382/173, 232, 233, 254, 305, 312; 348/241, 348/243–251, 675; 358/474, 483

(56) References Cited

U.S. PATENT DOCUMENTS

| | | | |
|---|---|---|---|
| 4,484,223 A | | 11/1984 | Tsunekawa |
| 4,942,474 A | * | 7/1990 | Akimoto et al. ............. 348/301 |
| 5,786,582 A | * | 7/1998 | Roustaei et al. ....... 235/462.07 |
| 5,926,214 A | * | 7/1999 | Denyer et al. .............. 348/241 |
| 6,061,092 A | | 5/2000 | Bakhle et al. |
| 6,101,287 A | | 8/2000 | Corum et al. ............... 382/274 |
| 6,144,408 A | | 11/2000 | MacLean |
| 6,646,245 B2 | * | 11/2003 | Nair ........................ 250/208.1 |
| 6,714,241 B2 | * | 3/2004 | Baer .......................... 348/241 |
| 6,747,696 B1 | * | 6/2004 | Nakata et al. .............. 348/243 |

OTHER PUBLICATIONS

Search Report issued on Aug. 17, 2004, in counterpart foreign application in the Netherlands under application No. 1022903.

* cited by examiner

Primary Examiner—Bhavesh M. Mehta
Assistant Examiner—Sheela Chawan

(57) ABSTRACT

A method and system for improving the quality of an image obtained by an electronic imaging system is disclosed. The method and system comprise capturing an image frame, capturing a partial dark frame and subtracting the partial dark frame from a corresponding section of the image frame. The steps of capturing a partial dark frame and subtracting the partial dark frame from a corresponding section of the image frame are repeated for additional partial dark frames.

11 Claims, 3 Drawing Sheets

MULTI-PASS DARK FRAME SUBTRACTION

CROSS-REFERENCES TO RELATED APPLICATIONS

This application is related to U.S. patent application Ser. No. 10/094,604 to Matherson et al., entitled "DARK FRAME SUBTRACTION USING COMPRESSION" filed on the same date herewith and incorporated herein in its entirety by reference.

TECHNICAL FIELD

The technical field is electronic imaging, specifically techniques for correcting the response of electronic imaging systems.

BACKGROUND

The popularity of electronic imaging has been on the rise as imaging systems such as digital cameras provide consumers with the ability to capture digital images and display the images using personal computers. Electronic imaging allows for the electrical correction of imperfections in a captured image. These imperfections may result from manufacturing process variations and thermal processes and defects within the structures that comprise sensors included in imaging systems.

It is well known in the art that noise, or radiation, from dark current, or thermally-generated current, degrades captured images, resulting in speckles or a grainy appearance in uncorrected captured images. In order to electronically correct for dark current, a calibration procedure known as dark frame subtraction is typically used. In dark frame subtraction for digital cameras the dark current noise is represented by a dark frame that is captured separately from an image frame. The image frame depicts the desired picture. The dark frame is captured under identical conditions as the image frame, but with the mechanical shutter of the camera closed to prevent incident light on the image sensors of the camera. Therefore, the dark frame captures the imperfections caused by dark current noise originating from within the camera. The dark frame is subtracted from the image frame to obtain a corrected image. Dark frame subtraction cancels the dark offset noise in the image frame and improves the quality of the image frame.

In conventional dark frame subtraction, the image frame and dark frame are stored in separate random access memory (RAM) buffers. The image frame is captured and stored in one memory buffer. Following capture of the image frame, the dark frame is captured under similar conditions and stored in a second memory buffer. The image frame and the dark frame are equivalent in memory size and, therefore, require memory buffers of approximately the same size. A processor in the camera subtracts the dark frame from the image frame and the result is stored in the first memory buffer. Therefore, two full size memory buffers are required to perform conventional dark frame subtraction.

SUMMARY

A method for improving the quality of an image in an electronic imaging system is disclosed. The method comprises the steps of capturing an image frame, capturing a first partial dark frame of a plurality of partial dark frames comprising a full dark frame, wherein each of the plurality of partial dark frames corresponds to a separate section of the image frame, and subtracting the first partial dark frame from the corresponding section of the image frame. The steps of capturing a partial dark frame and subtracting the partial dark frame from the corresponding section of the image frame for each of the remaining partial dark frames are repeated until all of the partial dark frames have been subtracted from corresponding sections of the image frame.

An electronic imaging system is disclosed. The system comprises means for capturing an image frame, means for capturing a partial dark frame of a plurality of partial dark frames comprising a full dark frame, wherein each of the plurality of partial dark frames corresponds to a separate section of the image frame, and means for subtracting the partial dark frame from the corresponding section of the image frame. The electronic imaging system also comprises means for repeating the steps of capturing a partial dark frame and subtracting the partial dark frame from the corresponding section of the image frame until all of the partial dark frames have been subtracted from corresponding sections of the image frame.

A method for improving the quality of an image obtained by a digital camera is disclosed. The method comprises the steps of capturing an image frame, capturing a partial dark frame, wherein the partial dark frame corresponds to a section of the image frame, and subtracting the partial dark frame from the corresponding section of the image frame. The steps of capturing a partial dark frame and subtracting the partial dark frame from the corresponding section of the image frame are repeated for additional partial dark frames.

Other aspects and advantages will become apparent from the following detailed description, taken in conjunction with the accompanying figures.

DESCRIPTION OF THE DRAWINGS

The detailed description will refer to the following drawings, wherein like numerals refer to like elements, and wherein.

DETAILED DESCRIPTION

Figure 1A:
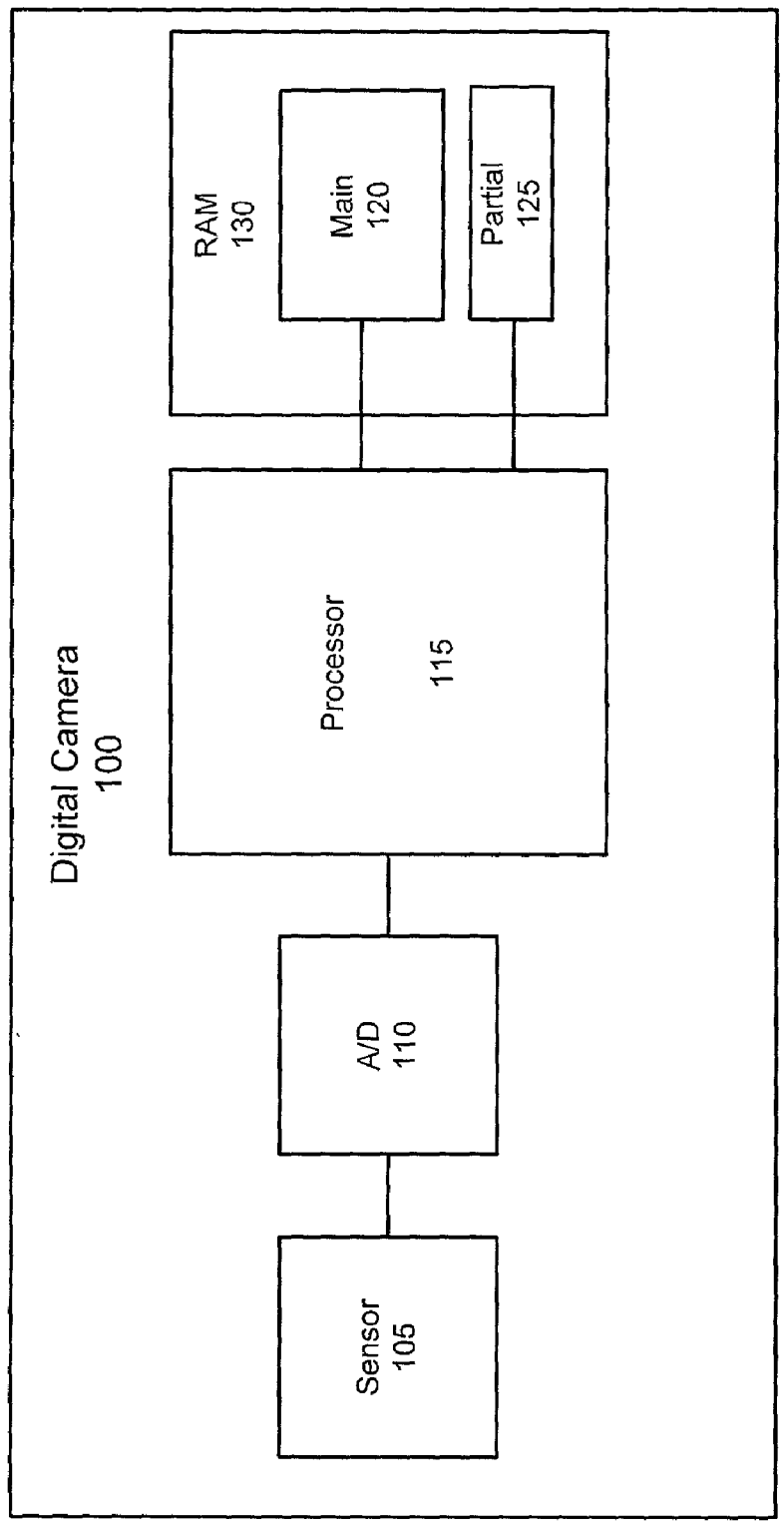
FIG. 1A is a schematic representation illustrating the capture of an image frame and a partial dark frame according to one embodiment.

FIG. 1A is a schematic representation illustrating the capture of an image frame and a partial dark frame according to one embodiment. In one embodiment, the electronic imaging system is a digital camera 100. A sensor 105 typically includes an array of light detecting elements, where each light detecting element produces a signal corresponding to the intensity of light impinging on that element when an optical image is focused on the array and detected. These signals may then be used, for example, to display a corresponding image frame on a monitor or otherwise used to provide information about the optical image. The light detecting elements are also capable of detecting forms of radiation other than light, including dark currents in the form of thermal radiation.

The sensor 105 may comprise, for example, a charge coupled device (CCD). A typical CCD comprises charge-integrating light detecting elements, or photosites, arranged in rows and columns. Each photosite responds to incident radiation by providing an electrical signal corresponding to one pixel of frame information. The sensor 105 may also comprise, for example, a complementary metal oxide semiconductor (CMOS) device. The CMOS device typically includes a photodiode or phototransistor used as a light detecting element, where the conductivity of the element corresponds to the intensity of light impinging on the element. The variable signal generated by the light detecting element is an analog signal whose magnitude is proportional to the amount of light impinging on the element.

The light detecting elements in the sensor 105 may be formed in a two dimensional core array which is addressable by row and column. Once a row of elements has been addressed, the analog signals from each of the light detecting elements in the row are coupled to the respective columns in the array. An analog/digital (A/D) converter 110 is used to convert the analog signals representing the image frame to digital signals.

A processor 115 reads the digital signals representing the image frame from the A/D converter 110 and stores the image frame in a main image buffer 120. The image frame is thereby captured by the digital camera 100. The captured image frame comprises a set of pixels, with each pixel having a numeric value representing the amount of charge contained in the corresponding light detecting element of the sensor 105. The processor 115 may comprise, for example, any of the processors known in the art that are typically used in digital cameras and other electronic imaging systems.

A full dark frame is captured in a similar manner by the digital camera 100, except that the shutter of the digital camera 100 is closed during exposure of the sensor 105. The full dark frame is captured immediately after the image frame under similar conditions as the image frame. The full dark frame is comprised of a plurality of partial dark frames, with each partial dark frame comprising a set of pixels, with each pixel having a numeric value representing the amount of charge contained in the corresponding light detecting element of the sensor 105. The processor 115 reads the digital signals representing a partial dark frame from the A/D converter 110 and stores the partial dark frame in a partial dark frame buffer 125. The main image buffer 120 and the partial dark frame buffer 125 are located in random access memory (RAM) 130. The captured image frame and the partial dark frames may comprise, for example, pixels arranged in a two dimensional array of rows and columns.

Figure 1B:
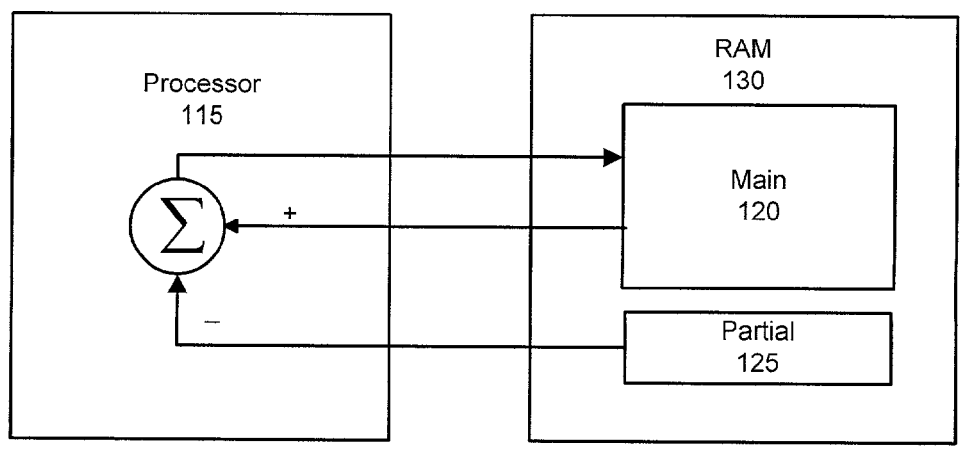
FIG. 1B is a schematic representation illustrating the subtraction of a partial dark frame from an image frame according to one embodiment.

FIG. 1B is a schematic representation illustrating the subtraction of a partial dark frame from an image frame according to one embodiment. The processor 115 reads the partial dark frame from the partial dark frame buffer 125 and subtracts the partial dark frame from a corresponding section of the image frame stored in the main image buffer 120. The subtraction process, described in more detail below, is multi-pass so that successive partial dark frames are iteratively subtracted from corresponding sections of the image frame until the entire image frame has been affected.

Figure 2:
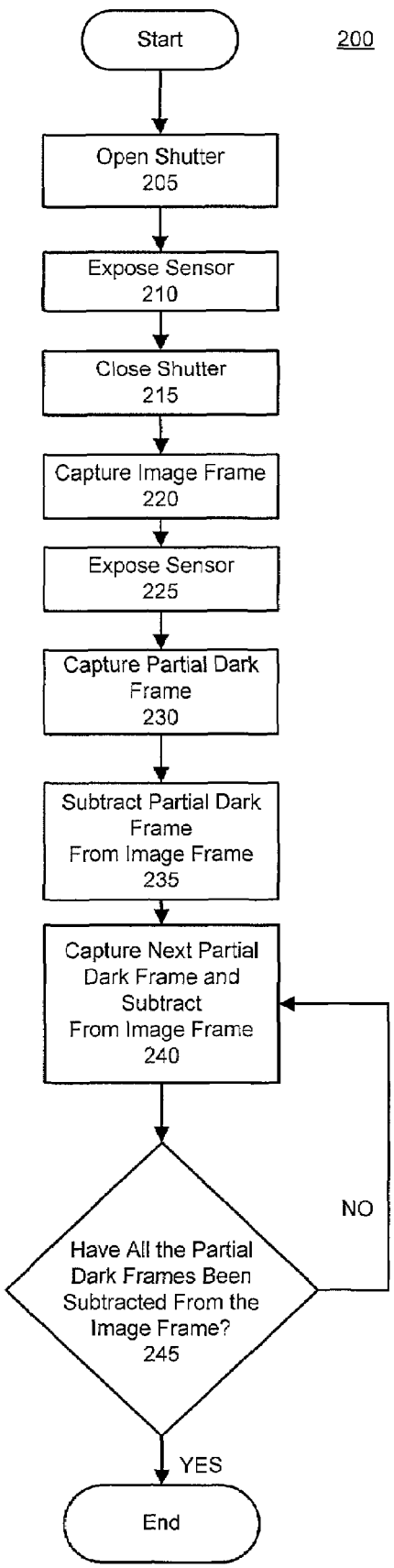
FIG. 2 is a flowchart illustrating a method for multi-pass dark frame subtraction according to one embodiment.

FIG. 2 is a flowchart 200 illustrating a method for multi-pass dark frame subtraction according to one embodiment. In step 205, the shutter of the digital camera 100 is opened, allowing the desired image to be focused on the sensor 105 and exposing the sensor 105 to incident light for a time $t_{exp}$ in step 210. During time $t_{exp}$ the sensor 105 is exposed to incident light originating externally from the digital camera 100 and dark current noise originating internally within the digital camera 100. Time $t_{exp}$ is determined by the digital camera 100 depending on the amount of light available for obtaining the desired image. The shutter of the digital camera 100 is then closed in step 215. In step 220, the image frame is captured by being detected and recorded by the sensor 105, converted into digital signals by the A/D converter 110, read by the processor 115 and stored in the main image buffer 120.

In step 225, with the shutter of the digital camera 100 closed, thereby blocking any light originating externally from the digital camera 100, the sensor 105 is exposed to any dark current noise, or thermally-generated current, originating internally within the digital camera 100 for time $t_{exp}$.

In step 230, a full dark frame of approximately the same size as the image frame is detected and recorded by the sensor 105 and a partial dark frame is converted into digital signals by the A/D converter 110. The partial dark frame is read by the processor 115 and stored in the partial dark frame buffer 125 in order to capture the partial dark frame. The processor 115 reads only a partial dark frame of the full dark frame, where the partial dark frame is read in as a set of pixels of the full dark frame. In step 235, the processor 115 subtracts the partial dark frame from a corresponding section of the image frame. The processor 115 subtracts the value of each pixel in the partial dark frame from the value of a corresponding pixel in the corresponding section of the image frame. The subtraction process may be repeated for every pixel in the partial dark frame. The subtraction process may include, for example, subtracting the value of each pixel in a row of pixels in the partial dark frame from the value of the corresponding pixel in the image frame, and then repeating this process for each subsequent pixel in the row of pixels and for subsequent rows of pixels in the partial dark frame.

In step 240, once the partial dark frame has been subtracted from the corresponding section of the image frame, the sensor 105 is exposed again with the shutter of the digital camera 100 closed in order to generate the full dark frame. The processor 115 reads a next set of pixels of the full dark frame to capture a next partial dark frame. The next partial dark frame is stored in the partial dark frame buffer 125 by overwriting the previous partial dark frame. The processor 115 then subtracts the next partial dark frame from the next corresponding section of the image frame pixel-by-pixel in a manner similar to that described above. In step 245, step 240 is repeated until each partial dark frame comprising the full dark frame is subtracted from corresponding sections of the image frame. The result is an improved image frame that has been corrected for the effects of dark current noise.

Using the multi-pass dark frame subtraction technique described above, the capacity of the partial dark frame buffer 125 may be significantly less than the capacity of the main image buffer 120, since the partial dark frame buffer 125 only stores a part of the full dark frame at any one time. The capacity of the partial dark frame buffer 125 need only be large enough to contain a partial dark frame, the size of which may be determined as desired. Typically, each partial dark frame may be, for example, one-half or one-third of the size of the full dark frame. Therefore, the partial dark frame buffer 125 may be, for example, one-half or one-third the size of the main image buffer 120, respectively. By increasing the number of iterations or "passes" described in step 240, the size of the partial dark frame buffer 125 may be further decreased.

Dark frame subtraction would be made possible in electronic imaging systems that would otherwise not have enough memory to perform conventional dark frame subtraction. Further, for electronic imaging systems capable of conventional dark frame subtraction, the decreased memory requirement allowed by multi-pass dark frame subtraction may result in additional memory space that may be used for an auxiliary image buffer. The auxiliary image buffer may be used to allow two or more image frames to be captured and stored in rapid succession before any processing is performed, thereby effectively providing a faster shot-to-shot time for the electronic imaging system.

While the present invention has been described in connection with an exemplary embodiment, it will be understood that many modifications will be readily apparent to those skilled in the art, and this application is intended to cover any variations thereof.

What is claimed is:

1. A method for improving the quality of an image in an electronic imaging system, comprising the steps of:
    (a) capturing an image frame;
    (b) capturing a first partial dark frame of a plurality of partial dark frames comprising a full dark frame, wherein each of the plurality of partial dark frames corresponds to a separate section of the image frame, and wherein each separate section of each of the plurality of partial dark frames comprises a set of pixels;
    (c) subtracting the first partial dark frame from the corresponding section of the image frame; and
    (d) repeating steps (b) and (c) for each of the remaining partial dark frames until all of the partial dark frames have been subtracted from corresponding sections of the image frame.

2. The method of claim 1, wherein step (b) further comprises:
    exposing a sensor to radiation that is internal to the electronic imaging system;
    detecting a full dark frame by the sensor;
    converting analog signals representing the full dark frame from the sensor to digital signals by an A/D converter;
    reading a partial dark frame of the full dark frame by a processor; and
    storing the partial dark frame in a partial dark frame buffer.

3. The method of claim 2, where the reading step further comprises reading a set of pixels of the full dark frame.

4. The method of claim 1, where the image frame and the partial dark frames comprise pixels, wherein each pixel has a value.

5. The method of claim 4, where step (c) further comprises subtracting a value of each pixel in the partial dark frame from a value of a corresponding pixel in the corresponding section of the image frame.

6. The method of claim 4, where step (c) further comprises:
    subtracting the value of each pixel in a row of pixels in the partial dark frame from the value of the corresponding pixel in the image frame; and
    repeating the subtracting step for each subsequent pixel in the row of pixels and for subsequent rows of pixels in the partial dark frame.

7. An electronic imaging system comprising:
    means for capturing an image frame;
    means for capturing a partial dark frame of a plurality of partial dark frames comprising a full dark frame, wherein each of the plurality of partial dark frames corresponds to a separate section of the image frame, and wherein each separate section of each of the plurality of partial dark frames comprises a set of pixels;
    means for subtracting the partial dark frame from the corresponding section of the image frame; and
    means for repeating the steps of capturing a partial dark frame and subtracting the partial dark frame from the corresponding section of the image frame for each of the remaining partial dark frames until all of the partial dark frames have been subtracted from corresponding sections of the image frame.

8. The electronic imaging system of claim 7, where the means for capturing the partial dark frame further comprises:
    a sensor;
    an A/D converter;
    a processor; and
    a partial dark frame buffer.

9. A method for improving the quality of an image obtained by an electronic imaging system, comprising the steps of:
    (a) capturing an image frame;
    (b) capturing a partial dark frame, wherein the partial dark frame corresponds to a section of the image frame, and wherein the partial dark frame comprises a set of pixels;
    (c) subtracting the partial dark frame from the corresponding section of the image frame; and
    (d) repeating steps (b) and (c) for additional partial dark frames.

10. The method of claim 9, where step (b) further comprises:
    exposing a sensor to radiation that is internal to the electronic imaging system;
    detecting a full dark frame by the sensor;
    converting analog signals representing the full dark frame from the sensor to digital signals by an A/D converter;
    reading a partial dark frame of the full dark frame by a processor; and
    storing the partial dark frame in a partial dark frame buffer.

11. The method of claim 9, where step (c) further comprises subtracting values of pixels in the partial dark frame from values of corresponding pixels in the corresponding section of the image frame.

* * * * *